United States Patent [19]
Pecnik et al.

[11] Patent Number: 5,241,822
[45] Date of Patent: Sep. 7, 1993

[54] AXIAL PISTON MACHINE FOR INSTALLATION IN A GEARBOX

[75] Inventors: Ivan Pecnik, Nagold; Josef Beck, Haigerloch, both of Fed. Rep. of Germany

[73] Assignee: Brueninghaus Hydraulik GmbH, Horb, Fed. Rep. of Germany

[21] Appl. No.: 939,987

[22] Filed: Sep. 3, 1992

[30] Foreign Application Priority Data

Sep. 11, 1991 [DE] Fed. Rep. of Germany ....... 4130225

[51] Int. Cl.[5] ............................................. F16D 31/02
[52] U.S. Cl. ....................................... 60/458; 91/506; 417/222.1; 74/60
[58] Field of Search ............................ 60/458, 487, 490; 91/504, 505, 506; 417/222 R; 74/60

[56] References Cited
U.S. PATENT DOCUMENTS

| | | | |
|---|---|---|---|
| 2,896,546 | 7/1959 | Lundgren et al. | 91/506 |
| 4,145,883 | 3/1979 | Forster | 60/458 |
| 4,508,011 | 4/1985 | Nolden | 417/222.1 X |
| 4,896,585 | 1/1990 | Forster | 91/506 X |
| 5,184,536 | 2/1993 | Arai | 91/505 |

Primary Examiner—Edward K. Look
Assistant Examiner—Todd Mattingly
Attorney, Agent, or Firm—Scully, Scott, Murphy & Presser

[57] ABSTRACT

The invention concerns axial piston machines for installation in gearboxes and for detachable attachment thereto, having an machine housing open on one side, a connection block which closes this housing and has a pressure duct and an suction duct for the pressure medium, and a driving shaft rotatably mounted in the machine housing and the connection block, which drive shaft projects from the axial piston machine for the purpose of connection to a gear unit, the gearbox being capable of being closed by means of a gearbox cover, and having through apertures for the supply and discharge of the pressure medium to the pressure duct and suction duct. In order to increase the operating reliability of the installed axial piston machine and for the easier installation and removal thereof, the axial piston machine is provided for attachment to the gearbox cover, attachment taking place by way of the connection block, which has a contact surface which bears in the attached state against an opposing surface of the gearbox cover, the pressure duct and suction duct open at the contact surface and the through apertures formed as connecting ducts open at the opposing surface, the contact surface is formed on the axial peripheral surface of the connection block, and the end of the driving shaft on the gear unit side projects from the connection block.

7 Claims, 3 Drawing Sheets

AXIAL PISTON MACHINE FOR INSTALLATION IN A GEARBOX

TECHNICAL FIELD OF THE INVENTION

The invention concerns an axial piston machine for installation in a gearbox.

BACKGROUND OF THE INVENTION AND PRIOR ART

Such an axial piston machine with a variable displacement volume, known from practice, is shown in FIG. 1. It is secured by means of screws 103 and with two projections 101 formed on the machine housing 100, to the inside of a vertical gearbox wall 102. The supply and discharge of pressure medium to the pressure duct and suction duct (not shown) and to a displacement volume setting mechanism 104 takes place by way of pressure medium pipes 105 (only one of these shown), which are led through holes passing through the gearbox wall 102 and are secured by means of threaded joints 106 to the connection block 107. The end of the driving shaft 108 on the gear unit side projects from the end wall 109 of the machine housing 100 opposite the connection block 107. A gear wheel 110 secured to this projecting end establishes the connection between the driving shaft 108 and a gear unit arranged in the gearbox. The end wall 109 and thus the gear wheel 110 are located closer to the screw attachments 103 than is the connection block 107. In this way, measured by the structural conditions, an optimal introduction into the axial piston machine of the driving and/or output forces acting on the driving shaft 108, is achieved.

OBJECT OF THE INVENTION

It is an object of the invention to develop an axial piston machine for installation in a gearbox such that its operating reliability in the installed condition is increased and its installation as well as its removal can be carried out more easily.

SUMMARY OF THE INVENTION

According to the present invention there is provided an axial piston machine for installation in a gearbox and for detachable attachment thereto, having an machine housing open on one side, a connection block closing this housing, within which block there extend a pressure duct and an suction duct for the pressure medium, and a driving shaft rotatably mounted in the machine housing and in the connection block, which drive shaft projects from the axial piston machine for the purpose of connection to a gear unit, the gearbox being capable of being closed by means of a gearbox cover and having through apertures for the supply and discharge of the pressure medium to the pressure duct and the suction duct, wherein the axial piston machine is provided for attachment to the gearbox cover, attachment takes place only by way of the connection block, the connection block has a contact surface which, in the attached state, bears against an opposing surface of the gearbox cover, the pressure duct and the suction duct open at the contact surface and the through apertures formed as connecting ducts in the gearbox cover open at the opposing surface, the contact surface is formed on the axis-parallel, peripheral surface of the connection block, and the end of the driving shaft on the gear unit side projects from the connection block.

Due to its attachment to the gearbox cover, the axial piston machine according to the invention can be disassembled therefrom in the simplest way by the removal of this cover from the gearbox. Installation can be carried out just as easily in reverse.

Attachment by way of the connection block as the part of the axial piston machine which is the most solid and is subject to the least vibration, together with the direct bearing of the connection block by way of its contact surface against the opposing surface of the gearbox cover, leads to a higher level of operating reliability since, in comparison to attachment to the machine housing by way of projections, according to the prior art, it is less subject to vibration and more stable.

Due to the latter feature, whereby the connection block bears directly against the gearbox cover, together with the opening of the pressure and suction ducts at the contact surface, as well as the through apertures in the opposing surface being formed as connecting ducts in the gearbox cover, the suction duct and the pressure duct are automatically connected at the same time as the attachment of the axial piston machine, without connection operations, by way of the connection ducts, to the pressure medium pipes connected thereto. This means not only a more rapid and simpler assembly and disassembly but also a further increase in the operating reliability of the axial piston machine secured to the gearbox cover, since the places required in the prior art for the pressure medium pipes to pass through the gearbox are no longer needed. In this way, wear of the pressure medium pipes causing damage or breaks at the places where these pipes pass through, is avoided.

Due to the formation of the contact surface on the axis-parallel peripheral surface of the connection block, the radial end surface of this connection block remains free, so that the driving shaft can be guided through the connection block, in order that the end on the gear unit side projects from the said connection block. Since the connection block represents the most solid part of the axial piston machine, from this arrangement there results an introduction into the axial piston machine of the driving and/or output forces acting on the driving shaft which is considerably improved relative to the prior art.

There is known from DE-OS 26 33 718 an axial piston machine in the form of a hydraulic pump for installation in a gearbox, this hydraulic pump being attached by way of a connection block to the gearbox cover. However, this known hydraulic pump is installed in the gearbox together with a variable motor as part of a hydraulic gear unit. The two axial piston machines are connected together by way of the connection block secured to the gearbox cover and, moreover, secured to the gearbox cover by way of their machine housings. In the connection block common to the two axial piston machines there is arranged the setting mechanism for the variable motor, as well as the suction and pressure connections for the hydraulic pump. Pressure medium pipes (not shown) connect the suction and pressure connections to corresponding connections of the variable motor. The driving shaft of each axial piston machine projects from the respective housing end wall opposite the common connection block.

BRIEF DESCRIPTION OF THE DRAWINGS

The invention is described in detail in the following with the aid of a preferred exemplary embodiments with reference to FIGS. 2 and 3 of the drawings.

In the drawings.

DETAILED DESCRIPTION OF PREFERRED EMBODIMENTS ACCORDING TO THE INVENTION

Figure 1:
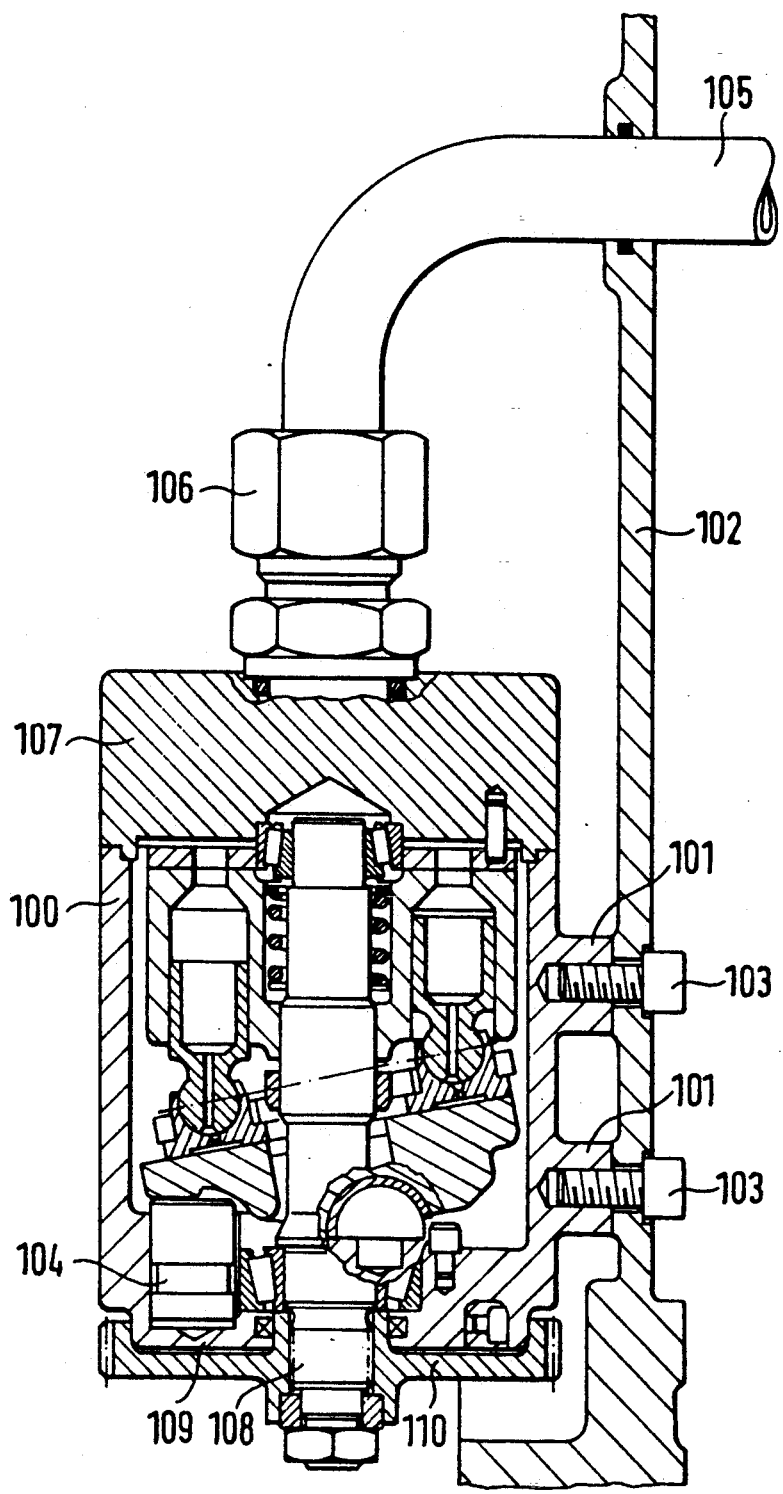
FIG. 1 shows an axial piston machine known from the prior art.
Figure 2:
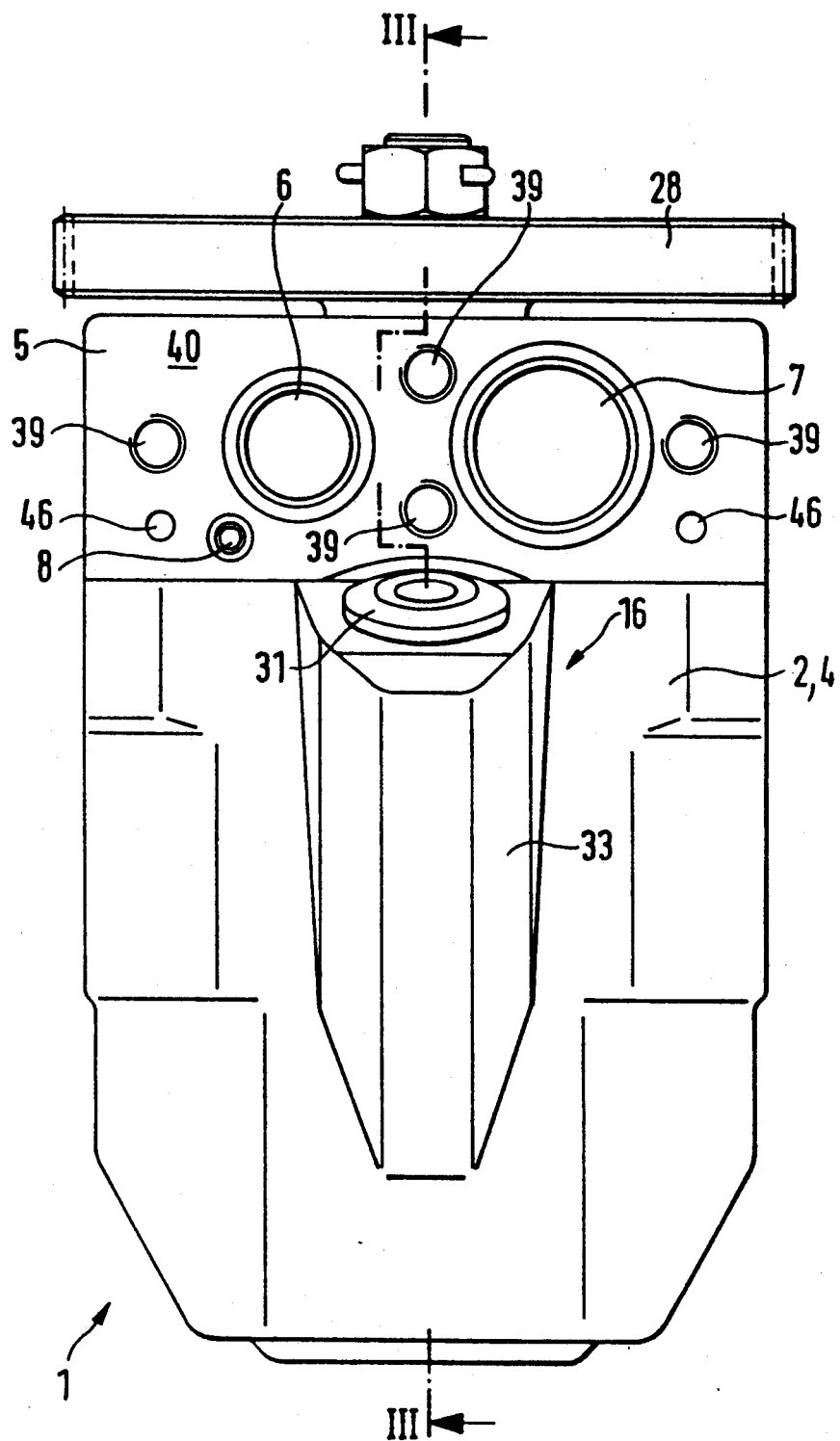
FIG. 2 shows a top view of the axial piston machine according to the preferred exemplary embodiment of the invention.
Figure 3:
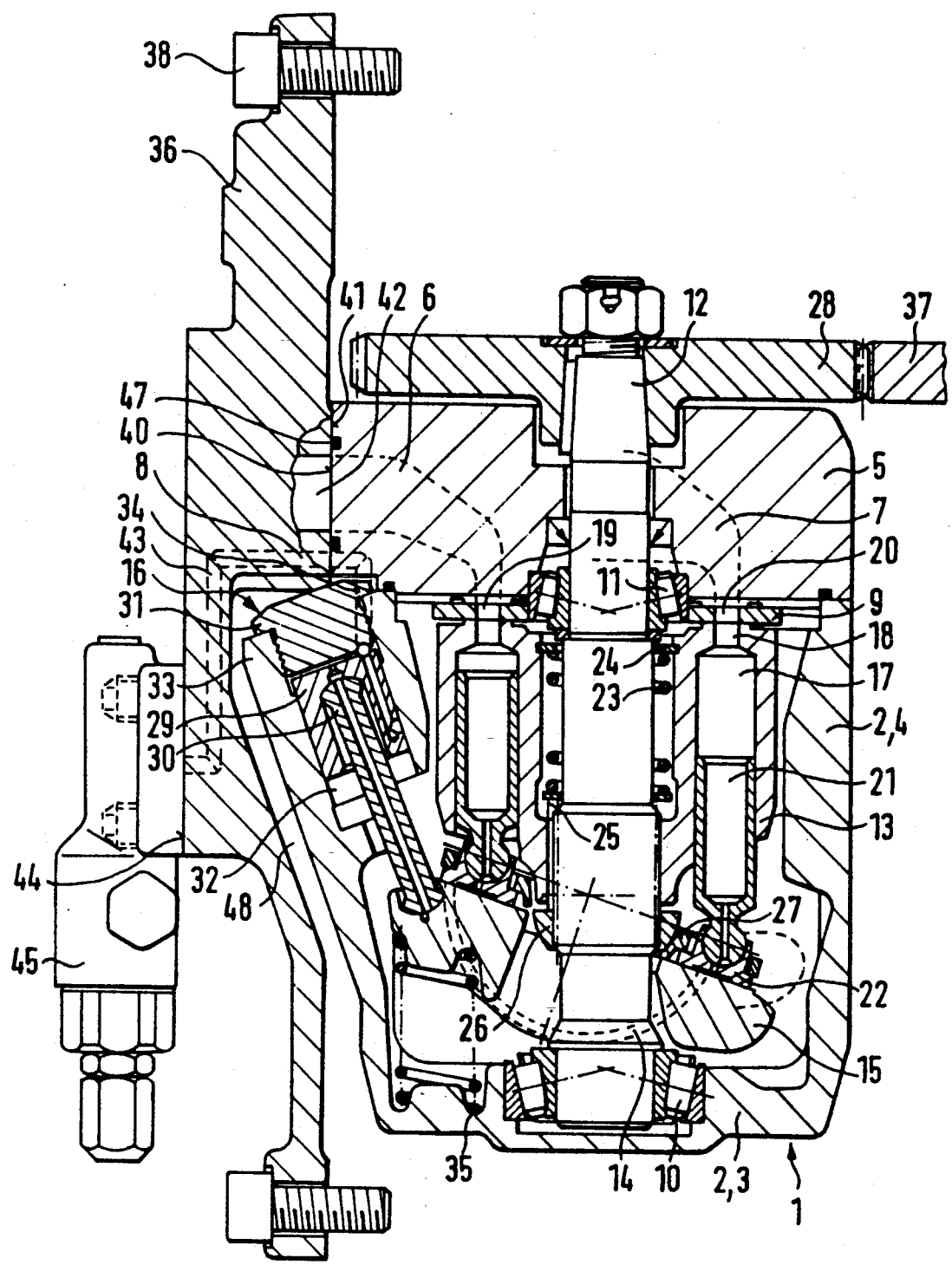
FIG. 3 shows a section along the line III—III in FIG. 2 of the axial piston machine according to FIG. 1 secured to the cover of a gearbox in the manner according to the invention.

The axial piston machine shown in the drawing is formed as a variable displacement pump 1 in the swash plate type of construction. Conventionally, it comprises an essentially cylindrical pump housing 2 open on one side with a housing end wall 3 and a housing cylinder wall 4, a connection block 5 closing the open end of the pump housing 2 and having a pressure duct 6, an suction duct 7 and a control duct 8, a control plate 9 arranged between the pump housing 2 and the connection block 5, a driving gear rotatably mounted by means of two cone bearings 10, 11 and having a driving shaft 12 and a cylindrical drum 13 arranged, fixed against rotation, on the shaft, a swash plate 15 pivotably mounted opposite this drum in bearing shells 14 on opposite sides of the housing cylinder wall 4, and a setting mechanism 16 for the adjustment of the swivel angle of the swash plate 15.

In the cylindrical drum 13 there are formed, in a known manner, axially extending and regularly distributed cylinder bores 17 which open by way of cylinder ducts 18 at the control surface of the cylindrical drum 13 facing the control plate 9. In the control plate 9 there are formed, in a known manner, two diametrically opposite control nodules 19, 20 which, during rotation of the cylindrical drum 13, establish the connection between the cylinder ducts 18 and the pressure duct 6 and suction duct 7, respectively. Pistons 21 displaceably guided in the cylinder bores 17, are supported at the piston ends located opposite the cylinder ducts 18 by way of slippers 22 against the swash plate 15. A compression spring 23 surrounding the driving shaft 12 within a blind hole in the cylindrical drum 13 acts, on the one hand, on the cylindrical drum 13 by way of a ring disc 24 in the direction of the control plate 9 and, on the other hand, retains the slippers 22 by way of pressure pins 25, a pressure head 26 with a spherical outer surface and a thrust ring 27 mounted thereon and in contact with the swash plate 15. The pressure pins 25 and the pressure head 26 are arranged, fixed against rotation, on the driving shaft 12.

The driving shaft 12 is mounted at one end in the housing end wall 3 by means of the cone bearing 10, passes with sufficient play through an aperture passing through the swash plate 15 and projects at its other end on the gear unit side from a corresponding through hole in the connection block 5. The cone bearing 11 supports the driving shaft 12 against the connection block 5 in the region of the control plate 9. On the end of the driving shaft 12 on the gear unit side, a gear wheel 28 is detachably secured.

The setting mechanism 16 comprises a slider 29, an adjusting bolt 30 and a terminal nut 31. The slider 29 is formed in a through hole 32 in a rib-like projection 33 of the housing cylinder wall 4, which projection extends obliquely to the driving shaft 12 in the direction of the swash plate 15. The slider 29 is displaceably guided in the through hole 32. The adjusting bolt 30 is arranged between the slider 29 and the edge of the swash plate 15, being engaged in a form-closing manner with both of these. The terminal nut 31 is screwed into the through hole 32, closing it on the outside. The control duct 8 opens by way of a extension duct 34 between the slider 29 and the terminal nut 31. The swash plate 15 is kept in contact with the adjusting bolt 30 by means of a helical spring 35 supported against the housing end wall 3. The operation of the variable displacement pump 1, which is by and large of conventional construction, is known and will therefore not be described. The variable displacement pump 1 is provided for installation in a closable gearbox represented by a gearbox cover 36, in which gearbox there is arranged a mechanical gear unit of a drive for a tractor for example, which gear unit is represented by a power take-off gear wheel 37. The gearbox cover 36 can be secured to the gearbox with the aid of screws 38.

The variable displacement pump 1 is secured to the inside of the gearbox cover 36, which has through holes (not shown) for this purpose, for receiving attachment screws (not shown) which are screwed into tapped holes 39 in the connection block 5. The tapped holes 39 open at a flat contact surface 40 of the axially extending peripheral surface of the connection block 5 and the through holes open at a corresponding opposing surface 41 on the inside of the gearbox cover 36. At the contact surface 40, the pressure duct 6, the suction duct 7 and the control duct 8 of the variable displacement pump 1 also open, as well as, at the opposing surface 41, respectively assigned connecting ducts 42 and a control connecting duct 43, which extend through the gearbox cover 36. The connecting ducts 42 are provided for the connection of corresponding pressure medium pipes (not shown). The control connection duct 43 opens at an attachment surface 44 formed on the outside of the gearbox cover 36, to which attachment surface there can be attached a control valve 45 for controlling the pressure medium supply to the setting mechanism 16 by means of a screw attachment (not shown), this valve being attached in such a way that its pressure medium outlet is aligned with the mouth of the control connecting duct 43.

The ducts 6, 7, 8 on the one hand and the connecting ducts 42 as well as the control connecting duct 43 on the other hand, are arranged respectively so that they are precisely aligned with each other when the variable displacement pump 1 is attached. At the same time, the ducts 6, 7, 8 and thus the connecting ducts 42 and the control connecting duct 43 are arranged relative to the screws 38 in such a way that, when the variable displacement pump 1 is attached, the gear wheel 28 meshes with the power take-off gear wheel 37 of the mechanical gear unit. A centring arrangement 46 consisting of centring pins on the opposing surface 41 and corresponding receiving holes in the connection block 5, make assembly easier and secure the latter arrangement. A sealing ring arrangement 47 in a corresponding groove in the contact surface 40 prevents the escape of pressure medium between the opposing surface 41 and the contact surface 40.

The rib-like projection 33 of the setting mechanism 16 projects in the radial direction beyond the outer surface 40; it is received, when the variable displacement pump 1 is attached, in a recess 48 on the inside of the gearbox cover 36.

For mounting on the gearbox cover 36, the variable displacement pump 1 is fastened by the contact surface 40 of the connection block 5 to the opposing surface 41 of the gearbox cover 36 in such a way that the centring pins of the centring arrangement 46 engage in the receiving holes thereof and, in this way, the ducts 6, 7, 8 in the connection block 5 are aligned with the connecting ducts 42 and the control connecting duct 43 in the gearbox cover 36. It is the same with the through holes in the gearbox cover 36 and the tapped holes 39 in the connection block 5, so that the attachment screws can be placed through the former and screwed into the latter in order to secure, in this way, the variable displacement pump 1 to the gearbox cover 36. The attachment of the control valve 45 to the attachment surface 44 of the gearbox cover 36 takes place in the same way. This cover can now be placed, together with the control valve 45 and the variable displacement pump 1, on the gearbox and secured thereto by means of the screws 38, with the meshing engagement of the gear wheel 28 with the power take-off gear wheel 37 of the mechanical gear unit taking place automatically. The variable displacement pump 1 can now be driven by way of the gear wheel 28 by means of the drive and/or the mechanical gear unit and adjusted from the outside with regard to its displaced volume by means of the control valve 45. Access to the variable displacement pump 1 is possible at any time; for this purpose, after the screws 38 are detached, the gearbox cover 36 can be lifted off the gearbox. The variable displacement pump 1 can now be removed, if required, after the attachment screws are detached from the gearbox cover 36. Installation of the variable displacement pump 1 takes place in the reversed manner.

The invention is not limited to a hydraulic pump but instead can also be realised with a hydraulic motor.

What is claimed is:

1. Axial piston machine for installation in a gearbox and for detachable attachment thereto, having an machine housing open on one side, a connection block closing this housing, within which block there extend a pressure duct and an suction duct for the pressure medium, and a driving shaft rotatably mounted in the machine housing and in the connection block, which drive shaft projects from the axial piston machine for the purpose of connection to a gear unit, the gearbox being capable of being closed by means of a gearbox cover and having through apertures for the supply and discharge of the pressure medium to the pressure duct and the suction duct, wherein the axial piston machine is provided for attachment to the gearbox cover, attachment takes place only by way of the connection block, the connection block has a contact surface which, in the attached state, bears against an opposing surface of the gearbox cover, the pressure duct and the suction duct open at the contact surface and the through apertures formed as connecting ducts in the gearbox cover open at the opposing surface, the contact surface is formed on the axis-parallel, peripheral surface of the connection block, and the end of the driving shaft on the gear unit side projects from the connection block.

2. Axial piston machine according to claim 1, wherein the contact surface and the opposing surface have a centring arrangement in the form of centring pins and corresponding receiving holes.

3. Axial piston machine according to claim 1, the displacement volume of which can be adjusted by means of a setting mechanism which can be actuated by a pressure medium, the said axial piston machine having a control duct for supplying the pressure medium to the setting mechanism, wherein the control duct opens at the contact surface and an associated control connecting duct formed in the gearbox cover opens at the opposing surface.

4. Axial piston machine according to claim 3, having a control valve for controlling the pressure medium supply of the setting mechanism, wherein the gearbox cover has on the outside an attachment surface at which the control connecting duct opens and on which the attachment of the control valve is provided.

5. Axial piston machine according to claim 3, the setting mechanism of which projects beyond the connection block in the radial direction, wherein the gearbox cover has a recess for receiving the projecting part of the setting mechanism.

6. Axial piston machine according to claim 1, being a hydraulic pump.

7. Axial piston machine according to claim 1, being a hydraulic motor.

* * * * *